R. BURNS.
AUTOMOBILE SIGNAL.
APPLICATION FILED JAN. 14, 1918.
1,289,110.
Patented Dec. 31, 1918.
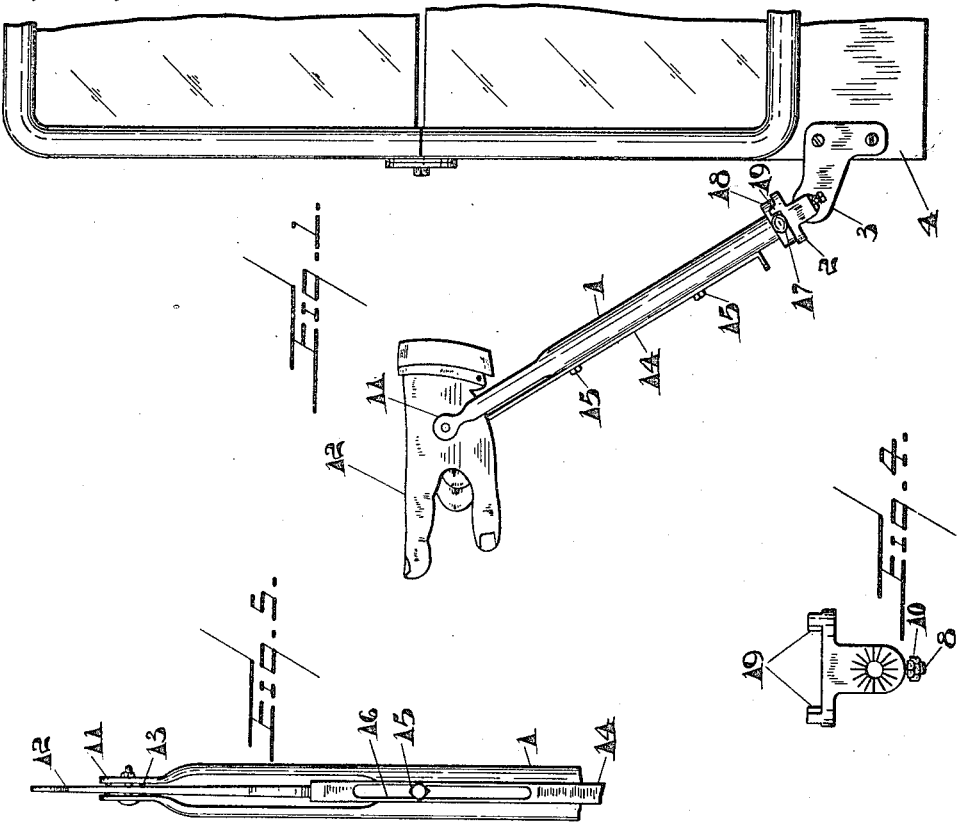
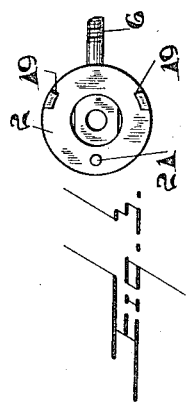
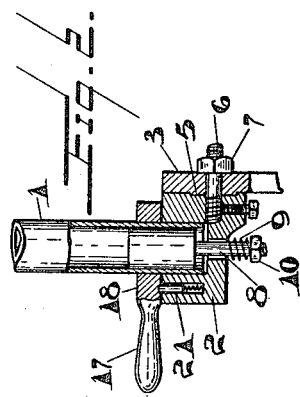
INVENTOR
R. Burns.
BY J. Edward Mayber
ATTY.

UNITED STATES PATENT OFFICE.

ROBERT BURNS, OF TORONTO, ONTARIO, CANADA.

AUTOMOBILE-SIGNAL.

1,289,110.  Specification of Letters Patent.  Patented Dec. 31, 1918.

Application filed January 14, 1918. Serial No. 211,820.

*To all whom it may concern:*

Be it known that I, ROBERT BURNS, of the city of Toronto, in the county of York, Province of Ontario, Canada, have invented certain new and useful Improvements in Automobile-Signals, of which the following is a specification.

This invention relates to devices which will enable the driver of an automobile to signal his intention of stopping, going ahead or turning to either right or left, and my object is to design a device of this type which will be very cheap to construct and which may be readily applied to any car without alterations thereto.

I attain my object by means of the constructions hereinafter described and illustrated in the accompanying drawings in which—

Figure 1 is a rear view of part of the dash and windshield of a motor car showing the signal device in position;

Fig. 2 a detail in longitudinal section showing the means for supporting and operating the signal carrying arm;

Fig. 3 a plan view of the socket piece which carries the arm;

Fig. 4 an elevation showing the face which engages the carrying bracket; and

Fig. 5 a side elevation of the end of the arm showing the pointer in end elevation.

In the drawings like numerals of reference indicate corresponding parts in the different figures.

1 is an arm, preferably tubular, which is journaled in the socket piece 2 so that it is rotatable on an axis longitudinal of itself. This socket piece is connected to a bracket 3, which may be of any suitable type for connection to the dash or the windshield frame of a motor car.

I show this bracket as formed for connection to the instrument board 4 of the car. The arm is held inclined outwardly from the car as shown in Fig. 1, but it is preferable that means should be provided for varying the angle so as to give the outer end of the arm, which carries the pointer, any suitable extension from the side of the car. I therefore provide the face 5 of the bracket 3, which is engaged by the socket piece 2, with suitable radial ribs and form a corresponding face on the socket piece.

From the socket piece extends a threaded stem 6, which passes through the bracket and is set up with a nut or nuts 7. This arrangement is an ordinary device for providing angular adjustment and will be readily understood without detailed description.

The socket piece is provided at its under side with an opening through which projects the stem 8 secured to the lower end of the arm 1. On this stem is located a coil spring 9, which bears against the socket piece and a shoulder member 10, which is preferably a nut screwed on the end of the stem 8. The arm is thus held in place so that it will turn readily and so that any wear is automatically taken up. The outer end of the arm is split to form the jaws 11, between which the pointer 12 is pivoted. This pointer will preferably have the outlines of a hand as shown. To reduce the rubbing surface between the pointer and the jaws 11, I prefer to stamp out teats 13 at the end of each jaw which provide the only contacts between the pointer and the jaws (see particularly Figs. 1 and 5.)

The hand is pivoted above its center of gravity and to insure the center of gravity being as far below the center of the surface as possible, I gradually increase the thickness of the material of which the pointer is formed from the top toward the bottom (see Fig. 5). The consequence of this construction is that the pointer will hang very steadily in a substantially horizontal position.

It will be evident that if the arm be turned the pointer may be caused to point to either right or left and will automatically adjust itself to hang in a horizontal position in whichever direction it be turned. An indication of the driver's intention to turn either to the right or to the left is thus easily given. If the arm be turned so that the pointer is substantially parallel to the direction of travel of the car, it will serve to indicate the intention of the driver to proceed straight ahead.

To enable a stop signal to be given, I provide the arm 1 with a slide 14, which is held in place by headed studs 15 passing through slots in the slide. The end of this slide will be adapted to engage the under part of the pointer as shown in Figs. 1 and 5, so that by moving up the slide the pointer will be tilted to point in a direction lengthwise of the arm, which will serve as an indication of the driver's intention to stop his car. Preferably the slot 16 adjacent the outer end of the slide 14 is made sufficiently long so that the cuff portion of the hand which forms the pointer may move through the slot to enable the hand to assume a position more nearly parallel to the axis of the arm 1. Sufficient spring is readily provided in the slide 14 so that it will be frictionally held in the position on the arm 1 to which it may be moved.

To enable the arm 1 to be readily turned, I secure to its lower end the handle 17 connected to a collar 18 surrounding the lower end of the arm. The socket piece 2 preferably has shoulders 19 formed thereon adapted to be engaged by the handle 17 on the collar 18. These stops limit the rotation of the arm so that it may be stopped with the hand pointing exactly across the car either pointing to the right or left. To indicate to the feel the intermediate position in which the hand points in a direction parallel to the direction of movement of the car, I prefer to provide the socket piece with a spring actuated plunger 21, the end of which is adapted to engage a slight recess formed in the collar 18. This device readily indicates to the feel the central position of the arm without interfering with its being moved in either direction from this central position.

From the above description it will be seen that I have devised a signal which will satisfactorily attain the objects of my invention as set out in the preamble to this specification.

What I claim as my invention is:—

1. The combination with a vehicle of an arm journaled on said vehicle to rotate on an axis longitudinal of the arm and a pointer pivoted at the outer end of the arm on an axis transverse of the arm, the pivot point being located intermediate of the ends and above the center of gravity of the pointer.

2. The combination with a vehicle of an arm journaled on said vehicle to rotate on an axis longitudinal of the arm and a pointer pivoted at the outer end of the arm on an axis transverse of the arm, the pivot point being located intermediate of the ends and above the center of gravity of the pointer, the pointer also being of gradually increasing thickness from top to bottom to bring its center of gravity below its center of surface.

3. The combination of an arm; a socket piece in which said arm is journaled to rotate on an axis longitudinal of the arm; a bracket on which said socket member is adjustably supported to swing on an axis transverse of the arm; and a pointer pivoted at the outer end of the arm on an axis transverse of the arm, the pivot point being located intermediate of the ends and above the center of gravity of the pointer.

4. The combination of an arm; a socket piece in which said arm is journaled to rotate on an axis longitudinal of the arm; a stem secured to the arm axially thereof and projecting through the socket piece; a shoulder member on the end of the stem; a coil spring located on the stem and bearing against the socket piece and shoulder member; an operating handle secured to the arm; and a pointer pivoted at the outer end of the arm on an axis transverse of the arm, the pivot point being located intermediate of the ends and above the center of gravity of the pointer.

5. The combination with a vehicle of an arm journaled on said vehicle to rotate on an axis longitudinal of the arm and a pointer pivoted at the outer end of the arm on an axis transverse of the arm, the pivot point being located intermediate of the ends and above the center of gravity of the pointer; and a slide on said arm adapted to rock said pointer to a point in a direction substantially lengthwise of the arm.

Signed at Toronto, Canada, this 28th day of Dec., 1917.

ROBERT BURNS.

Copies of this patent may be obtained for five cents each, by addressing the "Commissioner of Patents, Washington, D. C."